Oct. 26, 1965  W. HUNZIKER  3,213,817
FOLD OR SEAM CLOSING MACHINE
Filed April 11, 1963  3 Sheets-Sheet 1

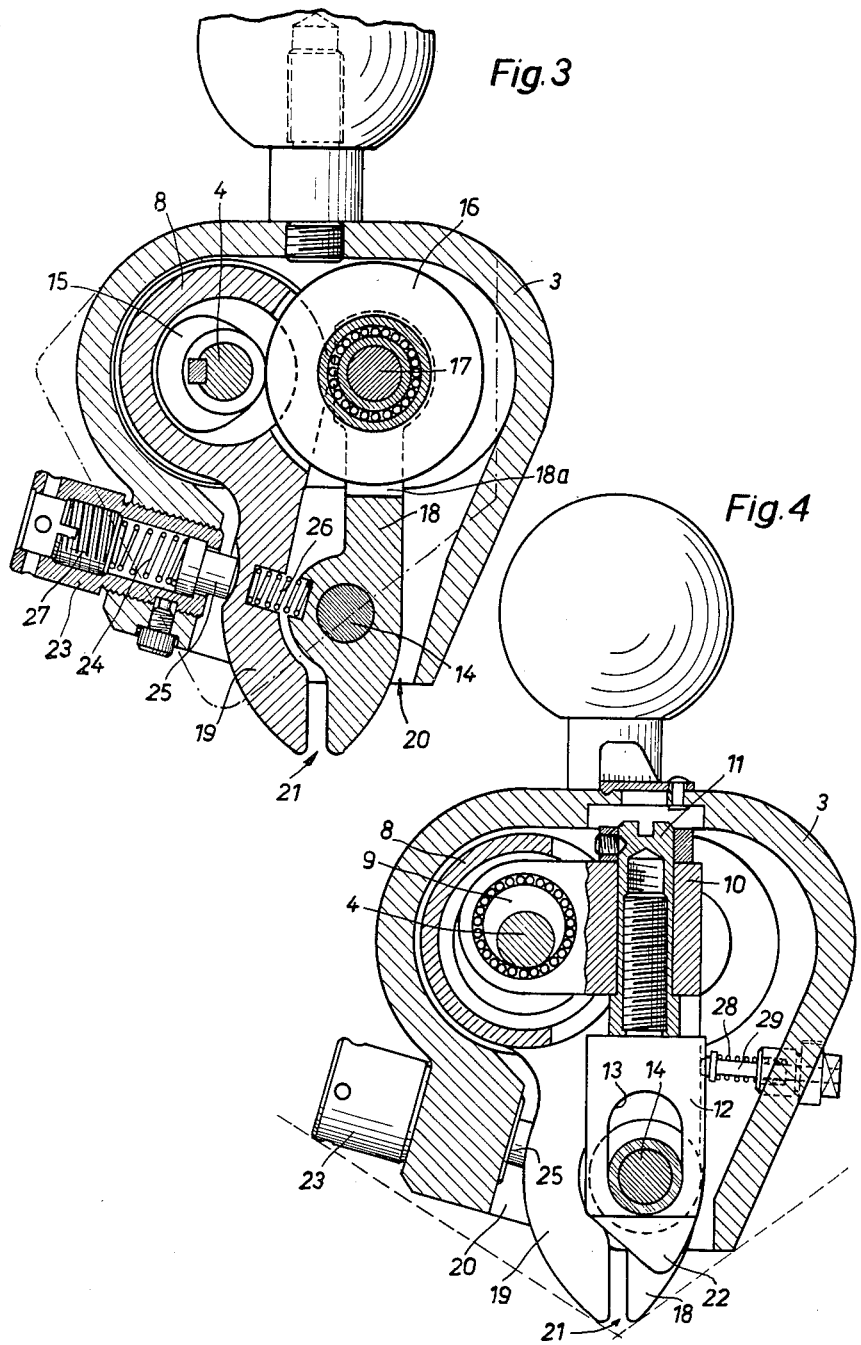

Oct. 26, 1965    W. HUNZIKER    3,213,

FOLD OR SEAM CLOSING MACHINE

Filed April 11, 1963    3 Sheets-Sheet 3

Werner Hunziker, Inventor

United States Patent Office 3,213,817
Patented Oct. 26, 1965

3,213,817
FOLD OR SEAM CLOSING MACHINE
Werner Hunziker, Winterthur, Switzerland
(Staffelbacherstr. 195, Kirchleerau/AG, Switzerland)
Filed Apr. 11, 1963, Ser. No. 272,436
Claims priority, application Switzerland, Apr. 14, 1962,
4,613/62
5 Claims. (Cl. 113—54)

Sheet metal plates, tube sections and other structural elements of sheet metal are usually interconnected by a fold or seam which is made in two subsequent working steps. In the first of these operational steps the edge portions of the sheet metal parts to be connected are pre-folded (generally to a right angle), which in most of the cases may be made mechanically and then annexed to each other. In the second operational step the fold or seam is closed, i.e. there is effected a second folding of one of the edges (generally to a right angle) whereafter the two superposed edge portions of the sheet metal parts are strongly pressed together. This second step is usually effected with a hand tool, e.g. a hammer and requires, beside a certain skill also much time. Particular difficulties are encountered in the closing of the seam or fold where the sheet metal parts meet in an obtuse angle of less than 180° as is always the case e.g. at the curved fold of a tube arc at the inner side of the arc.

The present invention refers to a fold closing machine, i.e. to a motor driven tool for the mechanical execution of the above-mentioned second operational step. The complicated, time-wasting and unprecise handworking may thereby be dispensed with resulting in a substantial increase of the working speed.

In accordance with the present invention such as fold or seam closing machine comprises pliers having a stationary working part and a working part movable in direction of opening and closing of the pliers, a plunger movable perpendicularly to the clamping edge of the pliers and provided with a working part wedge-shaped bevelled as well with respect to the clamping plane as also to the clamping edge of the pliers, and driving means coupled to the plunger in such manner that the working stroke of the plunger is effected with the pliers in closed position.

Owing to this construction it is possible to place the machine with the pliers onto the fold and to press whereby simultaneously the machine is fixed at the fold so that the plunger coming into action after the actuation of the pliers for finishing the folding of the next portion of the fold finds its support through the pliers directly at the fold. After each such operational step the machine is advanced along the fold to such an extent that the pliers seizes the fold portion pre-folded by the plunger while the latter executes the end-folding at the next fold portion.

Other features and advantages of the invention will become apparent from the description now to follow, of a preferred embodiment thereof, given by way of example only and in which reference will be made to the accompanying drawings, in which:

FIG. 3 is a cross-sectional view taken along the line III—III of FIG. 1,

FIG. 4 is a cross-sectional view taken along the line IV—IV in FIG. 1, and

Figure 2:
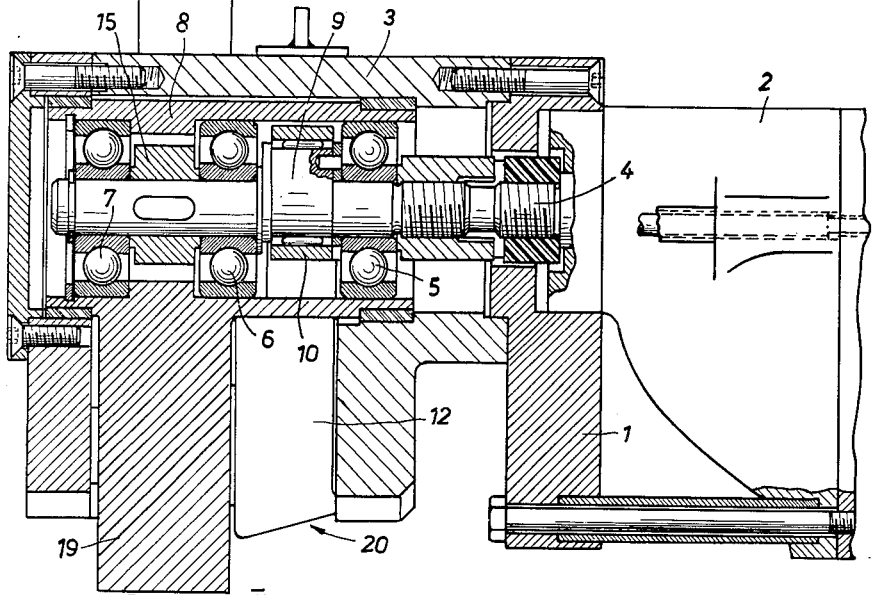
FIG. 2 is a section taken along the line II—II of FIG. 1.
Figure 1:
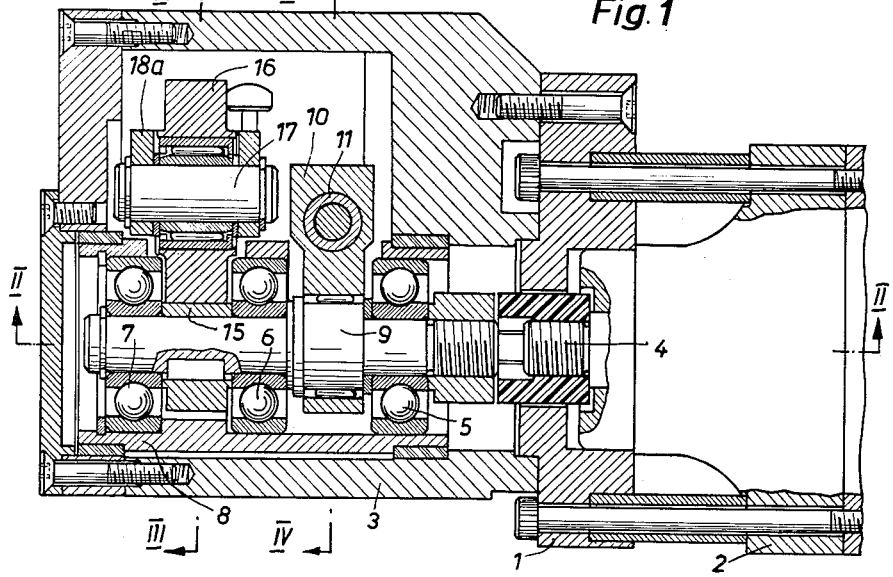
FIG. 1 is an axial section through the tool portion of the machine.

The portable fold or seam closing machine illustrated in the drawings comprises a bearing flange 1 to which are secured on the one hand a motor casing 2 with electric motor and on the other hand a tool casing 3 with the tools to be explained in more detail hereafter. The driving shaft 4 of the motor, penetrating into the tool casing 3 is guided in three spaced roller bearings 5, 6 and 7 of a bearing sleeve 8 supported in the tool casing 3.

Between the bearings 5 and 6 the shaft 4 carries a first driving nose 9 engaging the boring of a link 10 through a needle bearing. The other end of the link 10 is secured to a threaded bushing 11 traversing the link 10 in a direction perpendicular to the shaft 4. The threaded end of a plunger 12 is screwed into this threaded bushing 11 and this plunger 12 has a through-going longitudinal slot 13 extending parallelly to the shaft 4 and traversed by a transverse pin 14 secured in the casing 3 and carrying a bearing bushing.

A second driving nose 15 is seated in the shaft 4 between the two ball bearings 6 and 7. This second nose 15 cooperates with a roller 16 mounted on a pin 17 by means of a needle bearing. Both ends of the bolt 17 carry the two forks arms 18a of a folding arm 18 arranged on the transverse pin 14. The folding arm 18 forms the pivotable part of pliers having its stationary part formed by an arm 19 projecting from the bearing bushing 8. The free ends of both pliers arms 18 and 19 protrude outwardly through a longitudinal opening 20 of the tool housing 3 and are provided with plane clamping surfaces facing each other. In the open position of the pliers shown in FIGS. 3 and 4 both clamping faces extend substantially parallelly to each other in a determinated distance from each other. While the clamping edge 21 of the pliers extends parallelly to the driving shaft 4 the plunger 12 placed laterally to the pliers has a working surface 22 bevelled in form of a wedge both with respect to the clamping edge 21 as also with respect to the clamping plane 18, 19. The side walls of the tool housing extending parallelly to the shaft 4 diverge away from the longitudinal opening 20 whereby the protruding of the working parts of the pliers arms ascertains that the tangents to the pliers arms and to the casing, that are perpendicular to the clamping edge 21 of the pliers, enclose an angle that is as small as possible, i.e. inferior to 180° as is shown in interrupted lines in FIG. 4.

In order to make possible to adapt the width of the clamping gap of the open pliers to any requirements and at the same time to obtain a resilient counter-support for the stationary folding arm 19 a threaded bushing 23 is screwed into the casing 3, which bushing houses an abutting pin 25 loaded by a spring 24 and pressing against the folding arm 19 pivotally mounted in the casing 3 by means of the bearing bushing 8. A pressure spring 26 placed between the folding arms 18, 19 maintains the clamping gap open. A set screw 27 arranged in the box 23 affords for the adjustment of the spring action. In order to guarantee a safe return of the movable folding arm 18 into its open position and adjustable counter-spring 28 is arranged in the housing 3 loading a pin 29 pressing against the arm 18.

Figure 5A:
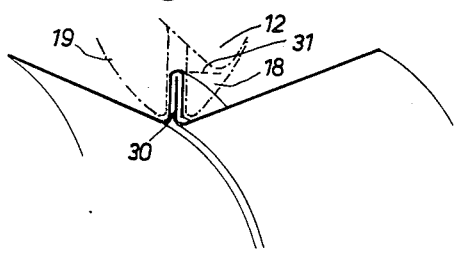
FIGS. 5a–5g are perspective views of a number of work pieces having their fold made with the machine according to FIGS. 1–4.

The operation of the illustrated and described machine shall now be explained with reference to FIG. 5a diagrammatically showing a sectional view of two sections of a tubular elbow part connected with each other by an annular fold. The described machine is placed by hand in such manner onto the pre-folded fold 30 (vide dot-and-dash lines in FIGURE 5a) that the open pliers 18, 19 come to lie onto a fold portion previously closed by hand, e.g. by means of a hammer, whereby the plunger 12 which is in its upper end position lies above of the folding portion to be next closed in direction of working. Thereby the working nose 9 is in the position shown in FIG. 4 in full lines and the nose 15 is in the position shown in full lines in FIG. 3. If the machine is now started the drive shaft 4 rotates the noses 9 and 15 clockwise in FIGURES 4 and 3 respectively. Thereby the nose 15 presses the roller 16 outwardly and consequently the pliers arm 18 pivots about the transverse pin 14 in the sense of closing the pliers which is thereby clamped onto the fold. Simultaneously the working nose 9 produces a slight pivotal movement and simultaneous lowering of the plunger 12 so that the latter working in the vicinity of the clamping gap of the pliers abuts with its bevelled surface 22 the rim portion 31 (FIG. 5a) the folding of which is not yet terminated, of one of the tube sections to be connected. Thereby this section is brought to lie downwardly against the other sheet metal parts. Immediately afterwards the nose 14 liberates the roller 16 and the pliers open under the action of spring 26 while at the same time the nose 9 produces the return of the plunger. The pliers then shortly released from the fold makes possible to advance the machine along the fold to such an extent that the pliers are placed onto the fold portion that has just been pre-folded by the plunger 12 so that at the next revolution of shaft 4 and of the noses 9 and 15 respectively the pliers 18, 19 close this pre-folded portion and the plunger folds downwardly the next rim portion 31 placed beneath it.

Since the individual tool movements follow each other rather quickly when the shaft 4 rotates the machine may be advanced practically continuously along the fold to be closed affording for a rapid work.

The operator only must take care that the clamping gap of the pliers remains parallel to the folding plane and that the fold does not spring out of the pliers. In view of the construction of the machine such handling is rather easily attained.

As is more particularly shown in FIG. 5a it is possible with the described machine to close folds on conical or convex sheet metal parts as they are met at the inner curve side of elbow parts of tubes.

Figure 5B:
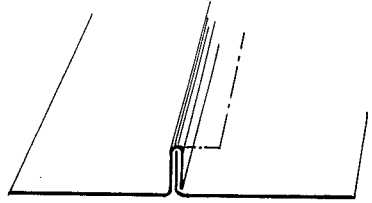
Figure 5C:
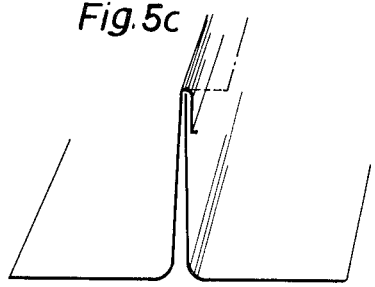
Figure 5E:
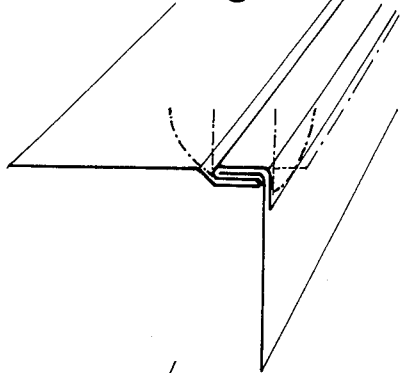
Figure 5D:
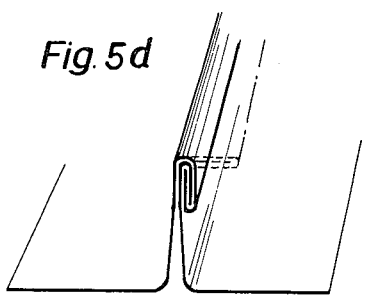
Figure 5F:
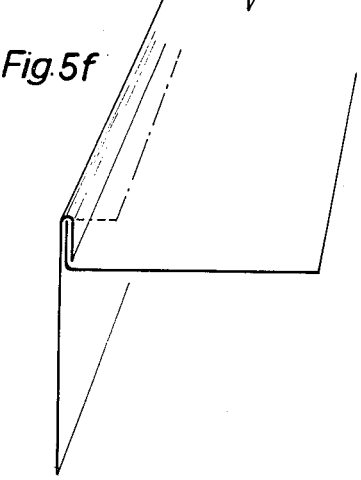
Figure 5G:
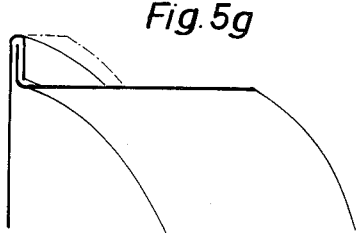

FIGURE 5b shows a longitudinal fold between two parallel sheet metal parts, which fold may be closed in the same manner as just described. FIGURES 5c and 5d illustrate a double or twin fold that may be closed with the described machine in two subsequent operational steps. FIGURE 5c shows the double fold after the first and FIG. 5d shows the fold after the second passage of the machine. FIGURE 5e illustrates a corner fold (also called "Pittsburg fold"). The closing of this fold requires pliers arms of corresponding shape. For this reason it is advantageous to make one or both pliers arms and in certain cases also the plunger exchangeable. A further example of a fold that may be closed with the described machine is the corner fold shown in FIGURE 5f. FIGURE 5g finally illustrates a fold between the bottom and the side walls of a sheet metal cylinder which fold may be closed analoguously.

From the foregoing the multiple possibilities of application of the described machine will be obvious to any skilled in the art.

I claim:
1. A fold closing machine comprising pliers having a stationary jaw and a pivotally mounted movable jaw, said jaws having substantially the same working length in the direction of movement of the device along a fold to be closed, a wedge shaped plunger movable perpendicularly to the clamping edge of said jaws and arranged ahead of said jaws in the direction of travel of the device when moving along a fold, said jaws having working edges facing each other and said plunger being located in the preceding side of said jaws and moving linearly and perpendicularly to the clamping edges of said jaws.

2. A fold closing machine as claimed in claim 1 wherein there is provided a driving shaft, an electro-motor for driving said driving shaft, a roller on said movable jaw, a first working nose on said shaft cooperating with said roller, a stationary transverse pin on which said movable jaw is mounted, a second working nose on said driving shaft, said plunger being mounted on said transverse pin for longitudinal and pivotal movement and a link carrying said plunger and cooperating with said second nose for actuating said plunger.

3. A fold closing machine as claimed in claim 2, comprising a bearing flange carrying on one side a housing for said electro-motor and on the other side a tool housing having a longitudinal opening for said jaws and plunger.

4. A fold closing machine as claimed in claim 3 wherein said driving shaft is guided in ball bearings in a bearing bushing supported in said tool housing and carrying said stationary jaw.

5. A fold closing machine as claimed in claim 4 wherein said stationary jaw is biassed against an adjustably spring loaded abutting pin.

References Cited by the Examiner
UNITED STATES PATENTS 1,816,318    7/31    Eksergian _____ 113—57

FOREIGN PATENTS 683,371    11/52    Great Britain.

CHARLES W. LANHAM, *Primary Examiner.*